United States Patent [19]

Reinhardt et al.

[11] 4,015,031
[45] Mar. 29, 1977

[54] PROCESS FOR HYDROPHOBIZING SILICAS AND SILICATES WITH ORGANOSILANES

[75] Inventors: Helmut Reinhardt, Rodenkirchen; Karl Trebinger; Gottfried Kallrath, both of Wesseling, all of Germany

[73] Assignee: Deutsche Gold- und Silber-Scheideanstalt vormals Roessler, Frankfurt, Germany

[22] Filed: Feb. 2, 1976

[21] Appl. No.: 654,707

[30] Foreign Application Priority Data

Mar. 27, 1975 Germany .......................... 2513608

[52] U.S. Cl. ............................... 427/213; 427/220
[51] Int. Cl.$^2$ ...................... B05D 1/00; B05D 7/00
[58] Field of Search ............ 427/213, 220; 252/383

[56] References Cited

UNITED STATES PATENTS

| | | | |
|---|---|---|---|
| 2,993,809 | 7/1961 | Bueche et al. | 427/220 |
| 3,012,861 | 12/1961 | Ling | 427/213 X |
| 3,600,326 | 8/1971 | Wilcox et al. | 252/383 X |
| 3,830,738 | 8/1974 | Cottrell | 252/383 X |
| 3,924,029 | 12/1975 | Schutte et al. | 427/213 |

FOREIGN PATENTS OR APPLICATIONS 519,230   12/1955   Canada .............................. 426/220

*Primary Examiner*—James R. ZHoffman
*Attorney, Agent, or Firm*—Cushman, Darby & Cushman

[57] ABSTRACT

Finely divided hydrophobic silica or silicate is produced by treating the dry, moving particles with an organic silane at elevated temperature. The silica or silicate which had been prepared by wet precipitation or pyrogenically and which is in powdered form is heated to a temperature of about 200° to 300° C. with agitation and is brought to a fluidized condition and then is treated dropwise with an organosilane which is stable and boils below 300° C.

9 Claims, No Drawings

PROCESS FOR HYDROPHOBIZING SILICAS AND SILICATES WITH ORGANOSILANES

The invention is directed to a process for the hydrophobization of finely divided silica and silicates by treatment of the dry, moving particles with organosilanes at elevated temperatures.

It is known to hydrophobize finely divided wet precipitated silica by a so-called coating. For this purpose, one can proceed for example in such fashion that a silicone oil acts either on the aqueous suspension of a precipitated silica or on a suspension of the dry powder in an organic solvent. It is also known to emulsify silicone oil in an amount up to 10% in a sodium silicate solution and to precipitate therefrom a modified silicate with a heavy metal salt which forms a difficulty soluble compound with silica.

It is also known to treat a mixed solution of 90% sodium silicate and 10% sodium methyl siliconate with an ion exchanger in the hydrogen form. In this process, a sol is formed by neutralization. The sol is dewatered axeotropically and then is dried. Finally, there is also described hydrophobization by esterification with alcohols at elevated temperatures. In this process also, the excess alcohol must be recovered by distillation.

Accordingly, to another known process, pasty silica produced by wet precipitation is washed after the filtration or centrifugation and is subsequently treated with alkali. For this purpose, there is established a pH of 8 to 12, preferably 9 to 10. Then there is mixed in silicone oil or a silicone oil emulsion and after this treatment the composition is dried, e.g., at a temperature of 100° to 120° C. The addition of the silicone oil or the silicone oil emulsion takes place simultaneously with, or after a preceding liquefaction of the high water containing filter cake or centrifuge residue. This liquefaction is accomplished by the action of suitable mechanical forces in the above given pH range. The desired pH valve is attained by adding an alkali solution or aqueous ammonia.

All known coating processes have the object of covering the large active surface area of the finely divided wet precipitated silica with the thickest possible layer of organic groups. Thereby the hydroxyl grounds are bound or screened off, so that they no longer can have effect in the use of silica as active filter for elastomers and other polymers. Besides these products because of their ease of break down of the thin organic layer very easily lose their hydrophobic properties. Apart therefrom, the previously known hydrophobization processes are besides cumbersome and time consuming. This particularly true in those cases, in which an organic solvent must be recovered.

To overcome the named disadvantages according to another known process, there can be produced an outstanding hydrophobic silica which has a high resistance to saponifying agents by precipitation from alkali silicate solutions with mineral acids and treatment with organohalosilanes, thus by coating, if there is added to the acid precipitated suspension recovered by known manner an organohalosilane, preferably at an elevated temperature of about 50° to 90° C., the precipitated product filtered off, washed and dried and then subjected to a temperature treatment at about 300° to 400° C. The product obtained has a loose structure and can be readily ground. The hydroxyl groups occurring in the silica surface are further broken down by the temperature treatment whereby the hydrophobic properties are strengthened. Since the treatment is undertaken in the suspension of precipitate produced in known manner, the use of a special hydrophobization apparatus is superfluous. Besides the suspension of silica precipitate can be washed more quickly and completely than the untreated suspension. A nearly electrolyte free product can be obtained thereby.

The hydrophobic properties furthermore can be regulated by the amount of organohalosilane used. It is generally sufficient to add 10 to 20 weight percent on the organohalosilane based on the precipitated dry silica.

However, there is the disadvantage in the last described process that the cost of the silane constitutes the largest part of the raw material costs. A saving of silane would therefore effect a considerable reduction in cost. There have already been undertaken experiments to reduce the amount of silane by use of silicas of lower surface areas. The effect was only slight since the saving does not take place in the composition in which the silica surface is reduced.

The degree of hydrohobization of a silica can be ascertained very well by determination of the DBA-number (dibutyl amine number). The adsorption of dibutyl amine is specific for acid groups, i.e., in the case of silica, the amine is only adsorbed by the silanol groups. If a silica is treated with silane, then with increasing addition of silane there is observed a reduction of the hydrophilic portion of the surface and therewith of the DBA-number. This is also established by determination of the methanol wettability. However, this method is only usable after a certain hydrophobicity. If there is pursued the change in DBA-number and therewith the hydrophobicity of a silica with increasing amounts of silane, it has been established that the change of the DBA-number always becomes smaller with increasing addition of silane. This means, if one assumes, a fixed amount of silane covers a fixed surface, that the yield of silane always becomes smaller with increasing degree of hydrophobization. This is understandable since the silane concentration in the solvent remains constant, the other reactant, however, the hydrophilic part of the silica is always reduced.

In a further development of this process, it is known to resort to precautions which make possible the improvement in yield in the last phase of the hydrophobization process. According to this known process for the production of a hydrophobic silica or silicate by precipitation from alkali silicate solutions with mineral acids or metal salt solutions and treatment with organohalosilanes in which an organohalosilane is added, preferably at temperatures of about 50° to about 90°., to an acid suspension obtained in known manner, the precipitated product filtered off, washed and dried and then subjected to a temperature treatment at about 300° to 400° C. there is used as the hydrophobization agent a prepolycondensed organohalosilane or a mixture of organohalosilanes, especially a precondensed dimethydichlorosilane and methyltrichlorosilane, see Reinhardt et al. application Ser. No. 581,890, May 29, 1975 (now abandoned). The prepolycondensed silane form larger molecules which first are only loosely adsorbed, but upon drying and tempering cover a large surface.

The silicas treated by this process can be used everywhere with advantage where there is dependence on a small wetting angle of silica to water, e.g., in cable mixtures, water resistant vulcanizates as thickening agents for water resistant lubricants and non-foaming cosmetics.

It is also known to hydrophobize silica or silicates in the dry way be evaporation or organohalosilanes. Thus, a hydrophobization process is carried out at elevated temperatures with moving particles of the highly dispensed oxides obtained by pyrolytic reaction of volatile halides of metals such as, for example, aluminum and titanium, and silicon, whereby the oxides are held in a fluidized suspension. The particles are subjected to a treatment of such type with organohalosilanes that the oxide, after first free from halogen, hydrogen halide and adsorptively bound water to the highest extent possible and with the exclusion of oxygen, is mixed as homogeneously as possible with the organohalosilanes and the mixture together with small amounts of steam and, in a given case together with an inert gas, is heated in the continuously running parallel flow process in a treatment space formed of an erect tubular oven at temperatures of 200° to 800° C., preferably 400° to 600° C., the solid and gaseous reaction products separated from each other and the solid products, in a given case subsequently deacidified and dried, whereby there is avoided contact with oxygen prior to cooling to below 200° C.

According to another known proces for hydrophobization of finely divided silica the treatment is carried out with organo-alkoxysilanes in which silica obtained pyrolytically or by precipitating alkali silicate solutions with acid after activation in a fluidized bed formed with the aid of an inert gas by a temperature treatment in the range of 700° to 1000° C. inside a space of less than 60 seconds, is mixed with an organo-alkoxysilane at pressures in the range of 1000 Torr to $10^{-2}$ Torr and at temperatures in the range of 20° C. to 300° C. over a time of from a few minutes to 48 hours is brought to reaction in a container or in a heated fluidized bed in parallel flow with a residence time of the reactants of between 1 and 10 minutes at temperatures in the range of 550° C. to 620° C.

Finally, it is known from Biegler German Pat. No. 1,249,236 to undertake a hydrophobization treatment of powdery, very finely divided silicon dioxide or silicates, for example in a glass or metal container at normal temperature by passing in silicon tetrafluoride vapor. Because of its flowability, the silicon dioxide can be treated as a liquid. After passing in $SiF_4$ for 1 hour with stirring in a closed container at room temperature and 1 hour heating to about 200° to 500° C. in a muffle furnace, the product is well hydrophobized. However, the specific surface area according to BET is reduced to about half the original value due to the binding of the OH groups. This is true both in the case of precipitated silica and pyrogenically produced silica. The water uptake in air still amounts to a 1 to 1.5%. The modified product is well hydrophobized against water and acid solution, however, it is wetted in the presence of alkali so that a permanent hydrophobicity cannot be attained by this process.

The relatively difficult handling of silicon tetrafluoride with reference to its attacks on the containers used and the gaseous introduction or the difficulties occurring in the purification of the waste air limit this process to a few special use cases. A further disadvantage is in the quality of the product obtained. A silica which is hydrophobized with silicon tetrafluoride is very unstable in treatment with alkali. Even the action of water vapor over a long time leads to a partial splitting off of hydrogen fluoride. This has the consequence that the hydrophobicity of the product is deteriorated or lost entirely. Besides toxic fluoride is split off. In contrast, products which are hydrophobized with silanes are strongly hydrophobic. The hydrophobic layer is substantially resistant to alkali, if it is split off the products formed are completely harmless.

The hydrophobization processes are either limited by the difficult handling of the agents used or by expensive apparatus on the one hand to a narrow particle size spectrum of the material to be hydrophobized or on the other hand are tied to specific areas of use and, therefore, are limited in their areas of possible use.

The invention begins with the problem of devising a process for the hydrophobization of finely divided silicas and silicates by treatment of the dry, moving particles with orgnosilanes at elevated temperatures which is characterized by a particularly broad area of use while employing the simplest method of hydrophobization.

The invention accomplishes this object by bringing into a fluidized condition powdered silica or silicate prepared by wet precipitation or pyrogenically and placed in a heatable container with stirring and simultaneous heating to a temperature of about 200° to 300° C. and while treating the silica or silicate dropwise with a stable organosilane boiling below 300° C.

The process proceeds from the known observation that finely divided silica and silicates show a certain flowability if it is stirred. However, if the silane is added dropwise during the stirring, this effect is greatly raised with the first small amounts of silane and reaches an optimum in the heating so that the powdery silica product behaves exactly like a liquid. The further silane dropped into this quasi-liquid distributes itself uniformly on the silica surfaces and forms there a hydrophobic layer.

The wet method of forming the silica or silicate can be accomplished, for example, by precipitation of an alkali silicate solution, e.g., aqueous sodium silicate or potassium silicate, or an aqueous solution of a silicate of a metal of Group II Group IV of the periodic system, e.g., aluminum silicate, calcium silicate, barium silicate, magnesium silicate, lead silicate, zinc silicate, sodium-aluminum silicate or calcium-aluminum silicate with a mineral acid, e.g., sulfuric acid, hydrochloric acid, nitric acid or phosphoric acid.

The pyrogenic and wet precipitation methods of forming the starting silica or silicate which is to be hydrophobized are conventional and are not part of the method of the invention.

As suitable organosilanes there have been particularly found suitable alkyl alkoxy silanes and aklyl halosilanes such as dimethoxy silane, methyltrimethoxy silane dimethyl dichlorosilane, triethylchlorosilane, methyl tribromosilane, dimethyl dibromosilane, trimethyl bromosilane, methyl trichlorosilane, ethyl trichlorosilanes, alkyl trichlorosilane, n-butyl trichlorosilane, diethyl dichlorosilane, trimethyl chlorosilane, ethyl allyl dichlorosilane, dimethyl dimethoxy silane, ethyl triethoxy silane, amyl triethoxy silane, vinyl triethoxy silane, butyl trichlorosilane, ethoxy triethyl silane, ethyl triethoxy silane, methyl triethoxy silane, dipropyl dichlorosilane, dipropyl dipropxy silane, butyl triethoxy silane, dibutyl dimethoxy silane.

The preferred organosilanes are dimethyl dimethoxysilane and dimethyl diclorosilane. As hydrophobization agents, there can also be used the waste products of the production of the silanes if they correspond to the other requirements, whereby dimethyl dichlorosilane is partially or completely replaced.

The process of the invention has the advantage over a fluidized bed that practically no waste air is formed and thus expensive filtration apparatus can be avoided. If chlorosilanes are used as the hydrophobization agent, a comparatively small HCl absorber is sufficient since practically pure hydrogen chloride must be absorbed. If alkyl alkoxy silanes are used as the hydrophobization agent, the alcohol developed can be simply burned.

The process of the invention is not limited to a narrow particle sprectrum of added silicas or silicates as in processes employing fluidized beds, but can be used in the area of the highest particle fineness, as is given for pyrogenically formed silicas, to the secondary structures, e.g., spray dried product. The requirement placed on the silanes used is that they boil below 300° C. and that they be stable at this temperature. Besides they must possess active groups, e.g., halogen or alkoxy, which can enter into reaction with the surface to be hydrohobized.

Unless otherwise indicated, all parts and percentages are by weight.

The invention will be further explained in the following examples.

EXAMPLE 1

There were loaded into a 2 liter round bottomed flask, 100 grams of a silica produced in an electric arc furnace and having a specific surface and of 210 m²/g (BET). With stirring the temperature in the oven was brought to about 300° C. with the help of a heating dome. Inside 5 minutes there were added dropwise 10 grams of dimethyl dimethoxy silane. The mixture was then stirred for 10 minutes at 300° c. and subsequently cooled. The silica no longer contained water wettable portions. The carbon content was 1.80S%. It was well suited for use as a flow agent for powders which are inclined to stick together.

EXAMPLE 2

Using the steps set forth in Example 1, a precipitated silica with a BET surface area of 180 m²/g was treated with a mixture of dimethyl dimethoxy silane and methyl trimethoxy silane (70.30). To obtain a good hydrophobicity, there was needed 11% of this silane. The carbon content of the treated silica was 1.9%.

EXAMPLE 3

Using the process set forth in Example 1, a sodium-aluminum silicate with a composition of

| | |
|---|---|
| $Al_2O_3$ | 12% |
| $SiO_2$ | 88% | was heated with dimethyl dichlorosilane.

For 100 grams of silicate there was required 11.5 grams of a mixture of 70% dimethyl dichlorosilane and 30% methyl trichlorosilane. The product obtained was well hydrophobized and contained 1.75% C bound to the surface.

The process can comprise, consist essentially of or consist of the steps set forth and using the materials.

The amount of hydrophobizing silane can be that conventional in the art. It is usually employed in an amount to provide 1 to 2.5% carbon on the silica or silicate.

What is claimed is:

1. In a process for hydrophobization of finely divided silica or silicate by treatment of dry moving particles of powdery silica or silicate produced by wet precipitation or pyrogenically with an organosilane at an elevated temperature the improvement comprising stirring the silica or silicate in a container at about 200° to 300° C. to bring the silica or silicate to a fluidized condition and while the silica or silicate is in said fluidized condition at said temperature treating the silica or silicate dropwise with an organosilane which is stable at said temperature and boils below 300° C., said organosilane having an active group which will react with the surface of the silica or silicate to be hydrophobized.

2. The process of claim 1 wherein the organosilane is an alkyl halosilane or an alkyl alkoxysilane.

3. The process of claim 2 wherein the organosilane comprises a dialkyl dihalosilane or a dialkyl dialkoxy silane.

4. The process of claim 2 wherein the organo silane is an alkyl alkoxy silane.

5. The process of claim 4 wherein the alkyl alkoxy silane comprise dimethyl dimethoxy silane.

6. The process of claim 2 wherein the organosilane is an alkyl halosilane.

7. The process of claim 6 wherein the organosilane is an alkyl chlorosilane.

8. The process of claim 7 wherein the organosilane comprises dimethyl dichlorosilane.

9. The process of claim 1 wherein sufficient organosilane is employed to provide a carbon content of 1.75 to 1.9% on the treated silica or silicate.

* * * * *